United States Patent [19]

Geiger

[11] 4,031,421

[45] June 21, 1977

[54] ELECTRIC GENERATOR

[75] Inventor: Otto Geiger, Schwabach, Germany

[73] Assignee: GeSig Energietechnik GmbH, Schwabach, Germany

[22] Filed: Sept. 24, 1975

[21] Appl. No.: 616,349

[30] Foreign Application Priority Data

Sept. 25, 1974 Germany .......................... 2445765

[52] U.S. Cl. ................................ 310/112; 310/114
[51] Int. Cl.$^2$ ............................................ H02K 19/34
[58] Field of Search ............. 310/112, 114, 126, 46

[56] References Cited

UNITED STATES PATENTS

| | | | |
|---|---|---|---|
| 3,374,376 | 3/1968 | Kromrey | 310/112 |
| 3,396,296 | 8/1960 | Esters | 310/46 X |
| 3,426,224 | 2/1969 | Esters | 310/41 |
| 3,510,699 | 5/1970 | Fredrickson | 310/114 X |
| 3,535,572 | 10/1970 | De Rugeris | 310/114 X |
| 3,603,823 | 9/1971 | Mason | 310/112 X |
| 3,713,015 | 1/1973 | Frister | 310/114 X |

Primary Examiner—Donovan F. Duggan
Attorney, Agent, or Firm—Allison C. Collard

[57] ABSTRACT

Electric generators having a rotor on a shaft and a stator, both carrying peripherally successive poles that have a substantially uniform angular distance or pole step therebetween, with at least one pair of electrically identical but separate, axially aligned generator sections that include pole cores that occupy substantially the same sectors as the gaps between them, and wherein the angular position of the rotor shaft, in which the poles overlap between the rotor and the stator of the same generator section, is offset for both sections by half the angular distance between the poles. Preferably at least one group of radially mounted, and at least one group of axially mounted, pole pairs os provided in both the rotor and the stator. Preferred exemplary embodiments are disclosed.

12 Claims, 10 Drawing Figures

ELECTRIC GENERATOR

This invention relates to an electric generator having a rotor and a stator, carrying respective, peripherally successive poles that have a substantially uniform angular distance therebetween.

In such generators efficiency is usually impaired in that the inductive current flows so that its magnetic field inhibits the conditional change by which the current was generated, as a result of which the rotation of the rotor with respect to the stator is counteracted. It is however just this rotation, resulting from outsie energy supply, that causes the inductive current to be produced. If one can reduce or neutralize this handicap, generally defined as the resultant field braking effect, the efficiency of such generators can be substantially improved.

It is therefore one of the objects of this invention to provide a high-efficiency generator, yet of a simple structure, by eliminating or neutralizing the resultant field braking effect that impairs the efficiency. Additionally the invention has as its object to use magnet poles with maximum saturation, without a surplus in rotary energy.

Economic considerations are to be increased further by using appropriate structural elements or units that can be combined into various types and sizes of generators that have different outputs.

In accordance with major features of this invention, the objects are attained in that rotors of at least a pair of electrically identical but separate generator sections are mounted on a common shaft, the sections having pole cores that occupy the same sector areas as the gaps between them, and wherein the angular position of the rotor shaft, in which the poles overlap between the rotor and the stator in the same generator section, is offset for both generator sections by half the angular distance between the poles.

Preferably the terminals or outputs of the two generator sections are so connected with a consumer or load that both sections are subject to about the same load.

As a specific solution to this optional feature, a double transformer can be used between the generator sections and the consumer.

In a further specific structural arrangement according to the invention, the rotors of the two generator sections can be combined into a single rotor structure, carrying the poles of both sections, wherein preferably the stator poles of the two sections are also offset by half the earlier-mentioned angular distance between the poles.

The generator sections preferably have at least one group of radially mounted, and another group of axially mounted, pairs of the rotor and the stator poles. The axially mounted poles are secured to both sides of the rotor.

The axially mounted poles may form at least two concentric rings. This feature can be supplemented by the similarly optional arrangement according to which the stator poles, in at least one group of the pole pairs, are disposed on at least two yoke field rings.

The invention also intends to cover stator poles that have superconductive coils with a helium core, each coil ring being provided with a separate helium inlet and outlet.

According to a specific, preferred, exemplary embodiment of the invention, the rotor can include at least two sections that are both mounted on the shaft, fitted on both sides with the axially mounted pole pairs, and on their peripheries with the radially mounted pole pairs.

The generator can be fitted with a cover, consisting of two or more sections that adjoin, and may have mating terminal or edge portions that allow interengagement between them. The pole pairs can be partly installed on the cover sections.

The invention will now be more fully explained, together with further objects and many of the attendant advantages, and it will be readily appreciated as the same becomes better understood by reference to the following detailed description, when considered with the accompanying drawings wherein.

Figure 1:
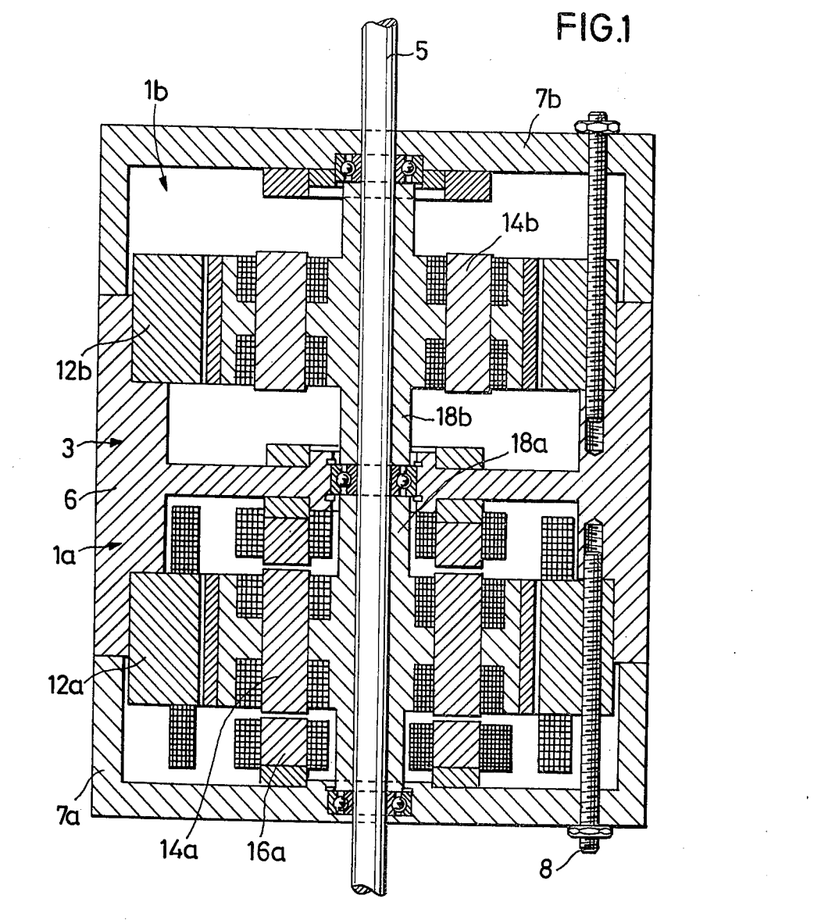
FIG. 1 is a schematic longitudinal section of an exemplary inventive generator embodiment, having two generator sections.
Figure 2:
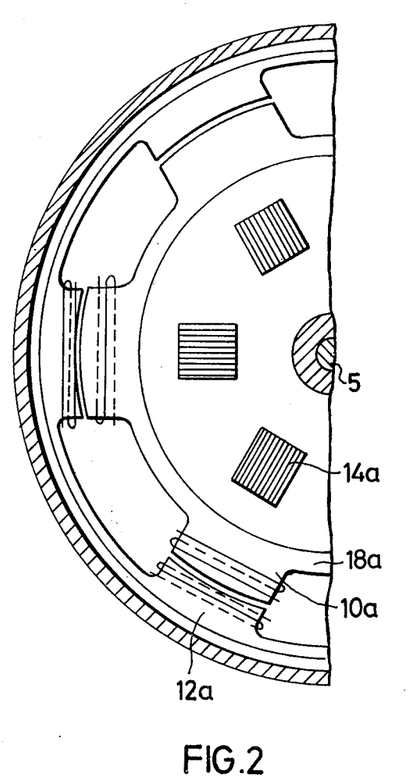
FIGS. 2 and 3 are respective, horizontal sections through the lower and the upper generator sections of FIG. 1, identical angular positions of a common rotor shaft being shown.
Figure 3:
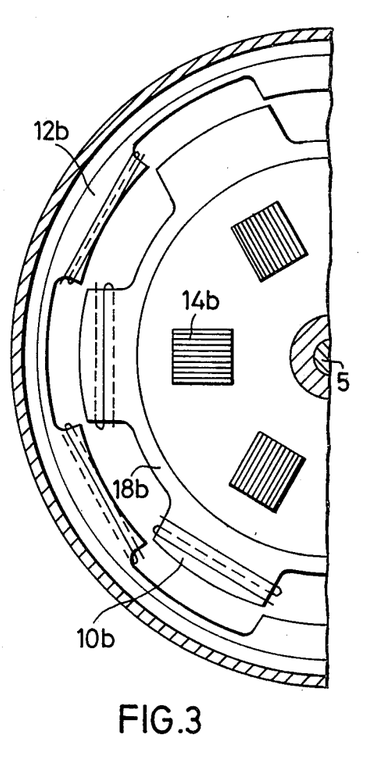
Figure 4:
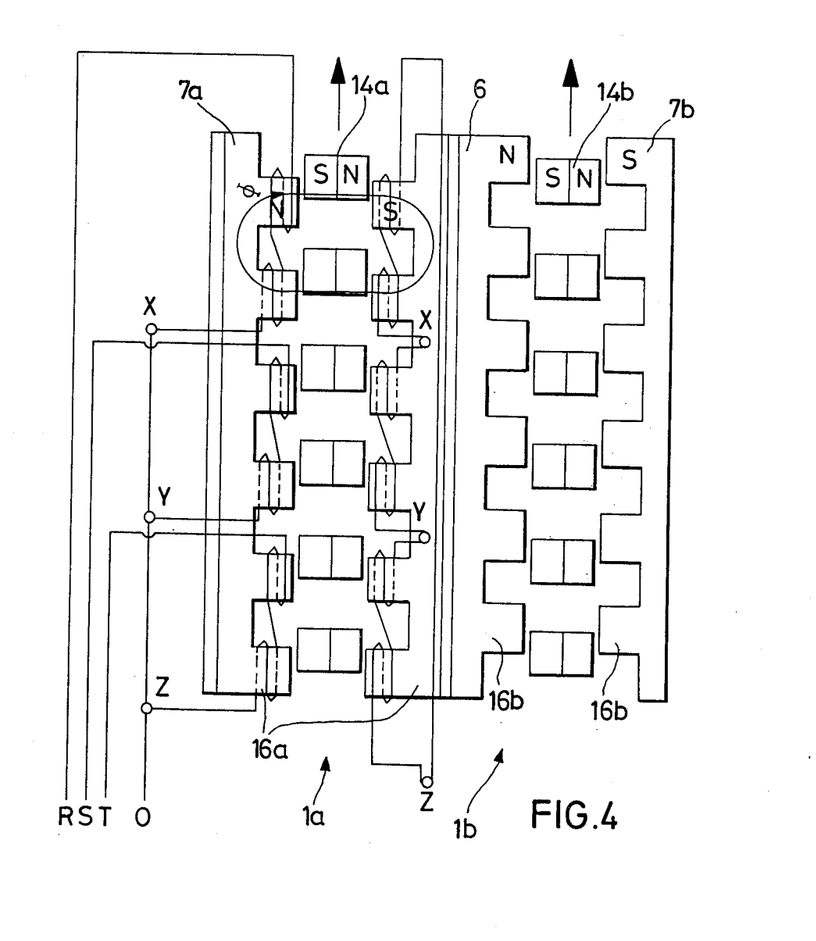
FIGS. 4 and 5 are schematic developments of axially arranged generator poles according to FIGS. 1 to 3, showing windings of the stator poles in star and delta connections, respectively.

The exemplary inventive generator shown in FIGS. 1 to 5 has a very compact and simple construction, comprising a central rotor shaft 5 having arranged thereon two groups of poles, namely radially disposed rotor poles 10$a$, 10$b$ and stator poles 12$a$, 12$b$, and axially arranged rotor poles 14$a$, 14$b$ (for the spatial arrangement of the parts refer to FIG. 4). Further details will be given when describing the embodiment of FIGS. 6 to 10.

Figure 5:
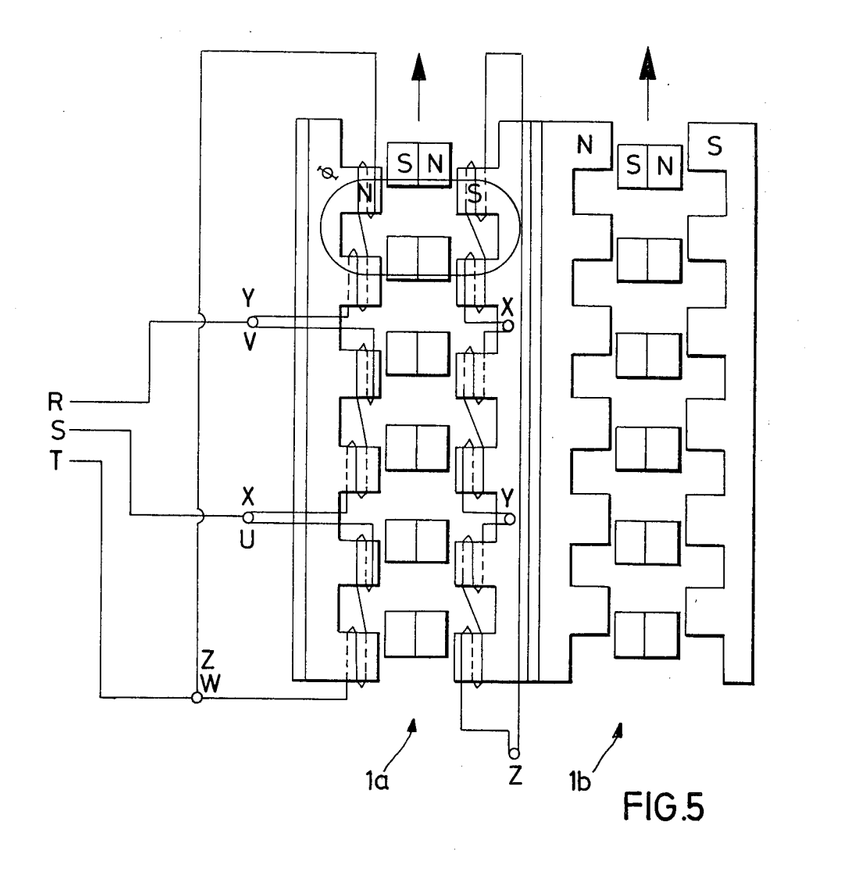

The respective lower and upper generator sections, as illustrated in FIGS. 2 and 3, are identified by numerals 1$a$ and 1$b$, also in FIGS. 4 and 5. The sections are coaxially disposed on the rotor shaft and surrounded by a common stator housing 3, the latter essentially including a center portion 6 and two end shields 7$a$, 7$b$; the latter can be pulled together, toward the center portion, by means of tie rods 8.

If the generator is constituted by several generator sections and pairs, it is possible to provide more than one successive intermediate portion similar to 6.

In the illustrated embodiment two rotors 18$a$, 18$b$ are rigidly connected with the shaft 5. The respective poles 10$a$, 14$a$ as well as 10$b$, 14$b$ are in identical angular positions, as can be seen in FIGS. 2 to 5.

In the development of planar rolling out of FIGS. 4, 5 the axially directed rotor poles, such as 14$a$, and also the (not included) radial poles e.g. 10$a$ assume positions which correspond approximately to the maximum pull-down moment when the magnetic field breaks off between these rotor poles of the generator section, and of the respective stator poles 12a, 16a, or in other words to the condition of maximum field braking of the generator section 1a.

The stator poles 12b, 16b of the other generator section 1b are offset by half a pole step or angular distance with respect to the stator poles 12a, 16a of the first generator section 1a, the term "pole step" being used herein interchangeably with the angular distance between two poles that succeed one another in the peripheral direction (sometimes also called pole distance).

In the position of the rotor shaft 5 shown in FIGS. 4, 5 each rotor pole 10b, 14b of the rotor 18b gets closer to the respective stator poles 12b, 16b, and is in the illustrated position within a range in which approximately maximum attraction or magnetic moment exists. The latter is opposed in its direction, related to the rotation of the shaft 5, to the pull-down moment of the first generator section 1a, which also acts on the shaft 5 by way of the rotor 18a. The pull-down moment of each generator section equalizes or cancels out the magnetic moment of the other.

Practical tests have shown that the proposed arrangement of the inventive generator sections is capable of completely neutralizing the resulting field braking, dispensing with (or actually saving) the rotational torque that was hitherto used to overcome this effect.

When using superconductive coils or windings a generator can be constructed according to the inventive principle that has an extraodinarily high efficiency.

As can be seen in FIGS. 4, 5 the pole cores of winding supports require sectors identical with the gaps or interstices between the pole cores or supports. If permanent magnets are used as rotor poles, the same applies to the surfaces of the opposing poles on which the lines of force concentrate. This has as a result that the respective pull-down moments of the generator sections are at all times and in all angular positions of the shaft 5 identical with the magnetic moments of the other sections, considering of course the described angular displacement of the generator sections.

In order to achieve the desired effect one must however ensure that the two electrically independent generator sections are always subjected to the same load. This can simply be achieved in that the sections 1a, 1b feed the consumer or consumers through a (not illustrated, conventional) double transformer and the like expedient.

It will be understood by those skilled in the art that in all figures, for ex. FIGS. 4 and 5, the letters N and S designate the known north and south poles while electrical connections or leads are designated by the internationally accepted symbols R, S, T; U, V, W; X, Y, Z and O. The arrows in FIGS. 4, 5 designate the common direction of rotation of the rotors 18a, 18b.

The second embodiment according to this invention, shown in FIGS. 6 to 10, improves economy in such generators, as will be explained, particularly by a specific, rather compact arrangement of the constituent parts.

Figure 6:
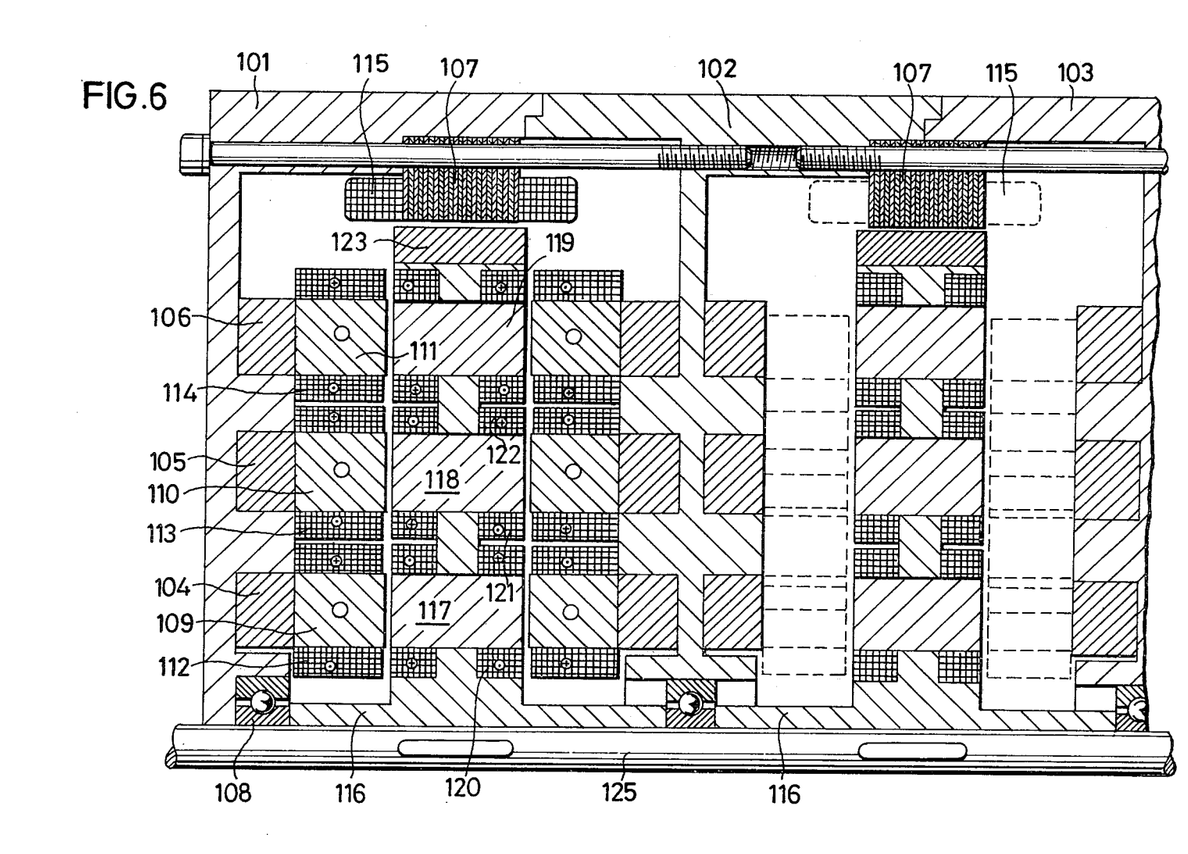
FIG. 6 illustrates an axial, sectional cut-out (one side only) through another exemplary embodiment of the inventive generator, portions thereof appearing in FIG. 7 in transversally take end and side views.

FIG. 6 shows the left-hand half of an inventive generator with a lower and an upper rotor 116 (similar to the sections 1a, 1b described so far), axially spaced apart with respect to a common rotor shaft 125 (similar to shaft 5; in the following similar bracketed numerals will refer to the parts of the earlier-described embodiment). The rotors 116 can also be correlated with the units 18a, 18b of the first embodiment. In several concentric groups the rotors are fitted with permanent or electromagnets having windings 120, 121 and 122 that are axially oriented. On the outer peripheries the rotors have radially oriented permanent magnets 123 that can be applied, for example, by casting.

The rotors are surrounded by a common housing, including, as a matter of example, two lateral or end portions 101, 103 (7a, 7b) and one or possibly more center portion(s) 102 (6). These elements are preferably plate- or disk-shaped, with cylindrical cut-outs (not shown) on their peripheries, allowing interengagement or overlap therebetween so that the generator presents a unitary and closed outer cover.

The end portions or covers 101, 103 carry separate axial yoke field rings 104, 105 and 106 on their inner surfaces that face the respective rotors, the rings having dynamo sheet bundles 109, 110, 111 applied thereto, as shown, which latter elements are provided with respective windings 112, 113, 114.

Opposite the outer peripheries of the rotors 116, and particularly of the magnets 123, radially outwardly disposed lamination rings or bundles 107 can also be arranged on the covers 101, 123, which bundles carry windings 115, constituting yoke field rings.

Figure 7:
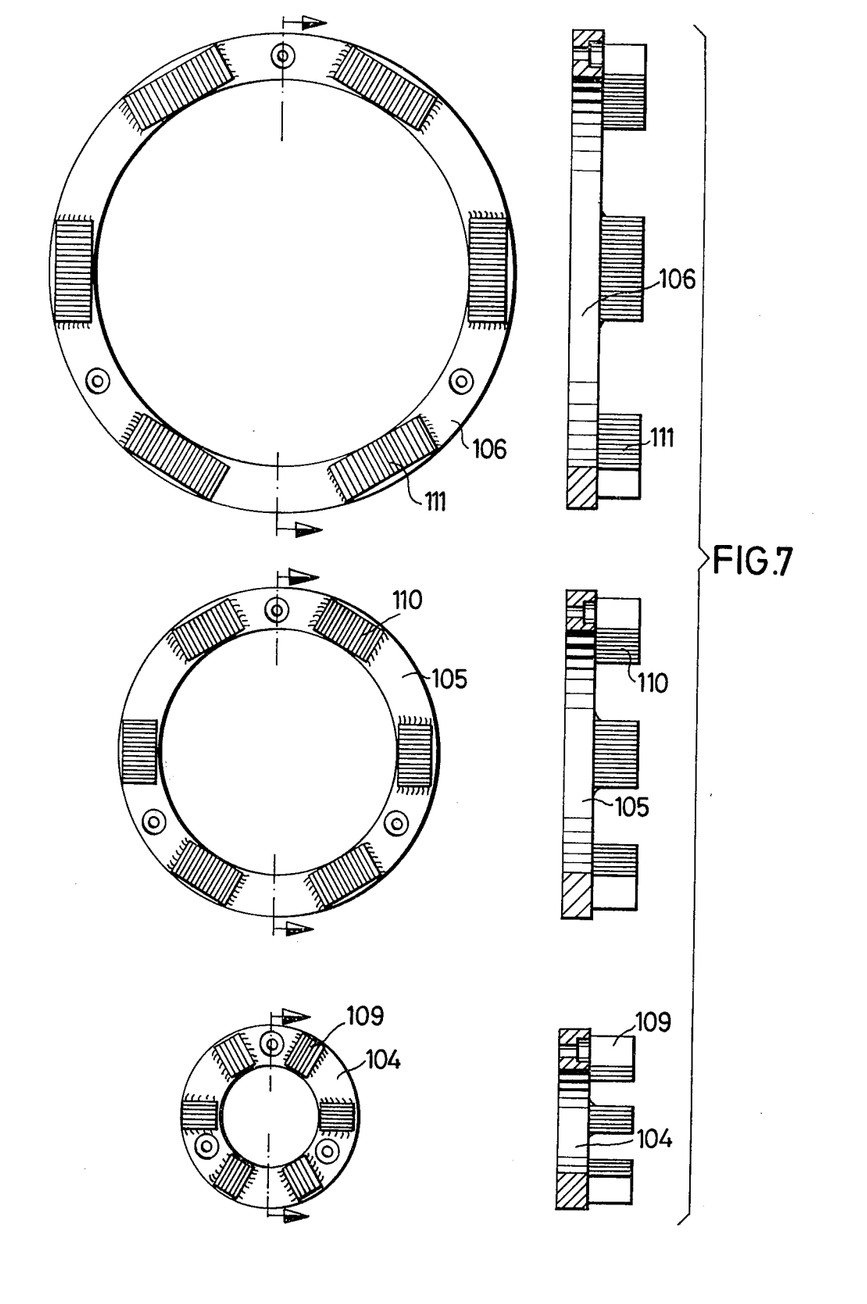
FIG. 7 is a combined detail view, both in front elevation and from the side, of concentric yoke field rings of FIG. 6.
Figure 8:
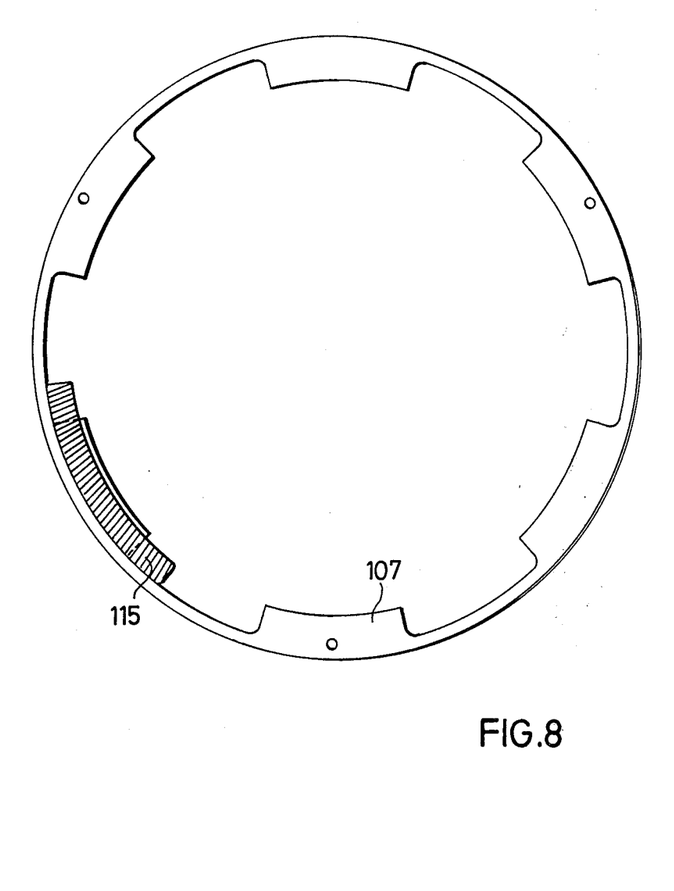
FIG. 8 is an end view of a laminated yoke field ring for radially directed stator poles.

The axially disposed yoke field rings 104 to 106 appear in FIG. 7 in front and side views, while FIG. 8 is an end view of a radially disposed yoke field ring or bundle 107.

In FIG. 6, the illustration is completed with conventional bearings 108 as well as cores or poles of intermediate members 117, 118 and 119, for the respective, earlier-described windings 120, 121 and 122.

Instead of the permanent magnets 123 on the rotors 116, a laminated bundle can be used (not shown) which can either serve as a short-circuited or a squirrel-cage rotor, or can have a winding thereon.

The just described generator arrangement allows several stages or sections to be axially aligned. the fact that all pole pairs, both the radial ones and those that are axially oriented, have identical pole steps, uniform frequency conditions are obtained.

Figure 9:
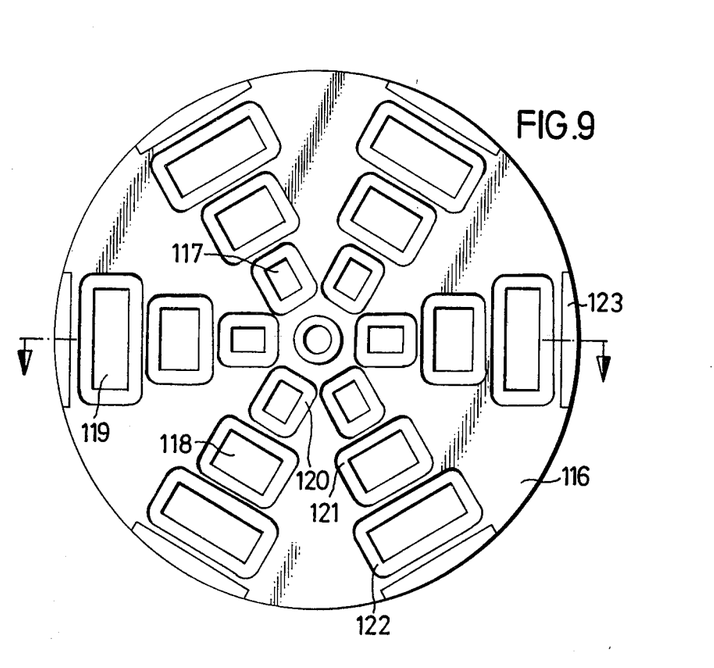
FIG. 9 is an elevation of a rotor according to FIGS. 6 to 8.
Figure 10:
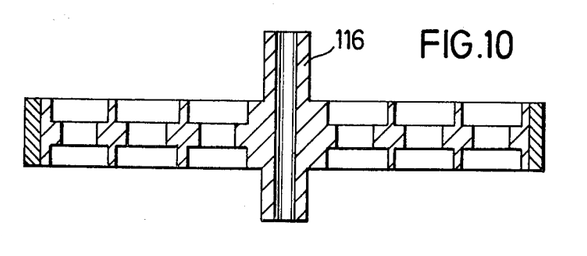
FIG. 10 is a transversal, axial section through a main body portion of the rotor.

FIG. 9 shows that the axially oriented pole pairs are so grouped and spaced that in each yoke field ring identical areas are used for the poles and for thier gaps.

The arrangement including axially directed pole pairs results in a space-saving construction which yields considerably high generator energy outputs.

The mentioned simple and compact set-up allows standardized coils or windings to be made for all axially directed poles, which can be applied subsequently onto the lamination bundles that are embedded in the yoke field rings or placed on appropriate pole cores of the rotor, and which windings can eventually be interconnected according to any desired electrical scheme, depending on the particular electrical generator type.

It should be understood, of course, that the foregoing disclosure relates only to preferred, exemplary embodiments of the invention, and that it is intended to cover all changes and modifications of the examples described which do not constitute departures from the spirit and scope of the invention.

What I claim is:

1. An electric generator comprising, in combination, a rotor with a shaft, a stator, both carrying respective, peripherally successive poles with a substantially uniform angular distance therebetween, and at least one pair of electrically identical but separate axially aligned generator sections, the latter including pole cores that occupy substantially the same sectors as gaps therebetween, and wheren the angular position of said shaft, in which position said rotor poles overlap between the rotor and the stator of the same generator section, is offset from both generator sections by half the angular distance between said rotor poles.

2. The generator as defined in claim 1, further comprising balancing means for connecting terminals of said generator sections in each pair to substantially the same consumer to avoid uneven loads therebetween.

3. The generator as defined in claim 1, wherein said generator sections have separate rotor sections that are combined on said shaft to constitute said rotor, the latter thus carrying said rotor poles of all sections.

4. The generator as defined in claim 3, wherein said stator poles in said generator sections are also offset by half the angular distance between said poles.

5. The generator as defined in claim 1, wherein said generator sections have at least one group of radially mounted, and at least one group of axially mounted, pairs of said poles in both said rotor and said stator.

6. The generator as defined in claim 5, wherein said axially mounted pole pairs are secured to both sides of said rotor.

7. The generator as defined in claim 5, wherein said axially mounted pole pairs form at least two concentric rings.

8. The generator as defined in claim 7, further comprising at least two yoke field rings on which said axially mounted stator pole pairs are disposed.

9. The generator as defined in claim 5, wherein said stator poles, in at least one of said groups of pole pairs, have thereon superconductive coils with a helium core.

10. The generator as defind in claim 5, wherein said rotor includes at least two rotor sections mounted on said shaft, fitted on both sides with said axially mounted pole pairs, and on their peripheries with said radially mounted pole pairs.

11. The generator as defined in claim 10, further comprising cover means constituted by at least two adjoining sections for carrying at least some of said axially and said radially mounted pole pairs.

12. The generator as defined in claim 11, wherein said cover sections have mating terminal portions for interengagement with such portions of neighboring ones of said sections.

* * * * *